United States Patent
Brown

(10) Patent No.: US 9,827,972 B2
(45) Date of Patent: Nov. 28, 2017

(54) MANUALLY OPERATED ELECTRICAL CONTROL AND INSTALLATION SCHEME FOR ELECTRIC HYBRID VEHICLES

(71) Applicant: Albert W. Brown, Newport Beach, CA (US)

(72) Inventor: Albert W. Brown, Newport Beach, CA (US)

( * ) Notice: Subject to any disclaimer, the term of this patent is extended or adjusted under 35 U.S.C. 154(b) by 0 days.

(21) Appl. No.: 15/288,806

(22) Filed: Oct. 7, 2016

(65) Prior Publication Data

US 2017/0247026 A1    Aug. 31, 2017

Related U.S. Application Data

(63) Continuation of application No. 14/616,305, filed on Feb. 6, 2015, now Pat. No. 9,463,786, which is a continuation of application No. 13/905,597, filed on May 30, 2013, now Pat. No. 8,950,527, which is a continuation of application No. 12/621,339, filed on Nov. 18, 2009, now Pat. No. 8,453,772, which is a continuation-in-part of application No. 11/460,583, filed on Jul. 27, 2006, now Pat. No. 7,628,236.

(60) Provisional application No. 60/704,497, filed on Aug. 1, 2005.

(51) Int. Cl.
| | | |
|---|---|---|
| B60W 10/08 | (2006.01) | |
| B60W 20/10 | (2016.01) | |
| B60L 11/18 | (2006.01) | |
| B60K 6/48 | (2007.10) | |
| B60K 26/02 | (2006.01) | |
| B60K 6/52 | (2007.10) | |

(52) U.S. Cl.
CPC ............... *B60W 20/10* (2013.01); *B60K 6/48* (2013.01); *B60K 6/52* (2013.01); *B60K 26/02* (2013.01); *B60L 11/1862* (2013.01); *B60L 11/1877* (2013.01); *B60K 2026/025* (2013.01); *B60L 2250/24* (2013.01); *B60Y 2200/92* (2013.01); *Y10S 903/903* (2013.01)

(58) Field of Classification Search
CPC ................ B60L 2250/24; B60K 26/02; B60K 2026/025
See application file for complete search history.

(56) References Cited

U.S. PATENT DOCUMENTS

| | | | | |
|---|---|---|---|---|
| 5,839,533 A | * | 11/1998 | Mikami | B60K 6/365 180/165 |
| 6,488,608 B2 | * | 12/2002 | Yamaguchi | B60K 6/26 180/65.25 |
| 7,094,177 B2 | * | 8/2006 | Inoue | F16H 59/105 340/456 |
| 9,400,050 B2 | * | 7/2016 | Baumer | F16H 59/0204 |

* cited by examiner

*Primary Examiner* — Brian Swenson
(74) *Attorney, Agent, or Firm* — Knobbe Martens Olson & Bear LLP

(57) ABSTRACT

A hybrid vehicle system facilitates operator control over electric power generation and use. The system features a motor/generator that can be mounted to an output of a transmission of the vehicle.

19 Claims, 9 Drawing Sheets

MANUALLY OPERATED ELECTRICAL CONTROL AND INSTALLATION SCHEME FOR ELECTRIC HYBRID VEHICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/616,305, filed Feb. 6, 2015, which is a continuation of U.S. patent application Ser. No. 13/905,597, filed on May 30, 2013, now issued as U.S. Pat. No. 8,950,527, which is a continuation of U.S. patent application Ser. No. 12/621,339, filed on Nov. 18, 2009, now U.S. Pat. No. 8,453,772, which is a continuation-in-part of U.S. patent application Ser. No. 11/460,583, filed on Jul. 27, 2006, now U.S. Pat. No. 7,628,236, which is related to and claims the priority benefit under 35 U.S.C. §119 of U.S. Provisional Patent Application No. 60/704,497, filed on Aug. 1, 2005, each of which is hereby incorporated by reference in its entirety.

BACKGROUND OF THE INVENTION

Field of the Invention

The present invention generally relates to hybrid drives for motor vehicles. More particularly, the present invention relates to manually controlled hybrid drives for motor vehicles featuring a driveline mounted motor/generator.

Description of the Related Art

Hybrid vehicles are being developed to reduce fuel consumption, among other reasons. Many hybrid vehicles are a compromise of a gasoline-powered vehicle and an electric vehicle. A parallel hybrid has a fuel tank that supplies gasoline to an engine and an electric energy storage system that supplies power to an electric motor. In the parallel hybrid, both the engine and the electric motor turn the transmission and the transmission drives the wheels. The goal, of course, is to harness two sources of power to increase efficiency while addressing drawbacks of each of the engine and the electric motor through the combination.

The hybrid vehicle, however, usually features a complicated control system that automates the integration of the two power sources. For instance, initiation of the electric power generation or initiation of motive power from the electric motor is automated. Such a control system is costly to develop and difficult to maintain.

SUMMARY OF THE INVENTION

One aspect of the present invention involves the recognition that by using human judgment to manipulate the operating modes instead of the usual more complicated, troublesome and expensive automated installations, simplified extraction of the maximum available inertia energy from the vehicle mass can be accomplished during deceleration. The use of human judgment also promotes intelligent reuse of the stored electrical energy to add to the vehicles primary power source during acceleration and short steady state speed conditions until the stored electrical energy is depleted. It is expected that the system will be most valuable for, but not limited to, use in commercial high gross weight vehicles, such as loaded delivery trucks that operate in a repetitive stop and go operational mode. For example, a commercial high gross weight vehicle can comprise a vehicle of about 10,000 pounds gross weight. Such vehicles often have drivers that can be motivated to conserve fuel and extend the life of the brakes.

Thus, one aspect of an embodiment of the present invention involves a hybrid system for a vehicle. The vehicle comprises a vehicle structure, a combustion engine mounted to the vehicle structure, at least one wheel supporting the vehicle structure and a driveline extending between the combustion engine and the at least one wheel. The driveline comprises a transmission. The transmission comprises an output shaft. The driveline further comprises a differential. The differential comprises an input shaft. The hybrid system comprises an electric machine that is coupled to the transmission output shaft and the differential input shaft. The electric machine is electrically connected to an electric machine controller. The electric machine controller is adapted to control the electric machine. An energy storage system is in electrical communication with the electric machine. The energy storage system is adapted to store electrical energy generated by the electric machine and to return electrical energy to the electric machine. An electric load bank also is connected to the electric machine. The electric load bank is adapted to dispel electrical energy generated by the electric machine. An electric load bank controller is in electrical communication with the electric load bank and is adapted to divert electrical energy into the electric load bank for conversion of the electrical energy into heat energy when a predetermined voltage level is attained in the energy storage system. A manual user interface is connected to the electric machine controller and is adapted to switch the electric machine between a generator mode and a motor mode.

Another aspect of an embodiment of the present invention involves a hybrid system for a vehicle comprising a vehicle structure. The hybrid system comprises a motor/generator that comprises a shaft. A first end of the shaft is connectable to a first driveline component and a second end of the shaft is connectable to a second driveline component. The motor/generator is electrically connected to a controller. The controller is electrically connected to a manually-operated control actuator. The manually-operated control actuator and the controller control operation of the motor/generator such that the motor/generator functions in a generator mode or a motor mode as dictated by the manually-operated control actuator.

A further aspect of an embodiment of the present invention involves a hybrid system for a vehicle comprising a vehicle structure, said hybrid system comprising a motor/generator, said motor/generator being mounted to a driveline of said vehicle, said system comprising means for manually controlling said motor/generator.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENT

Figure 1:
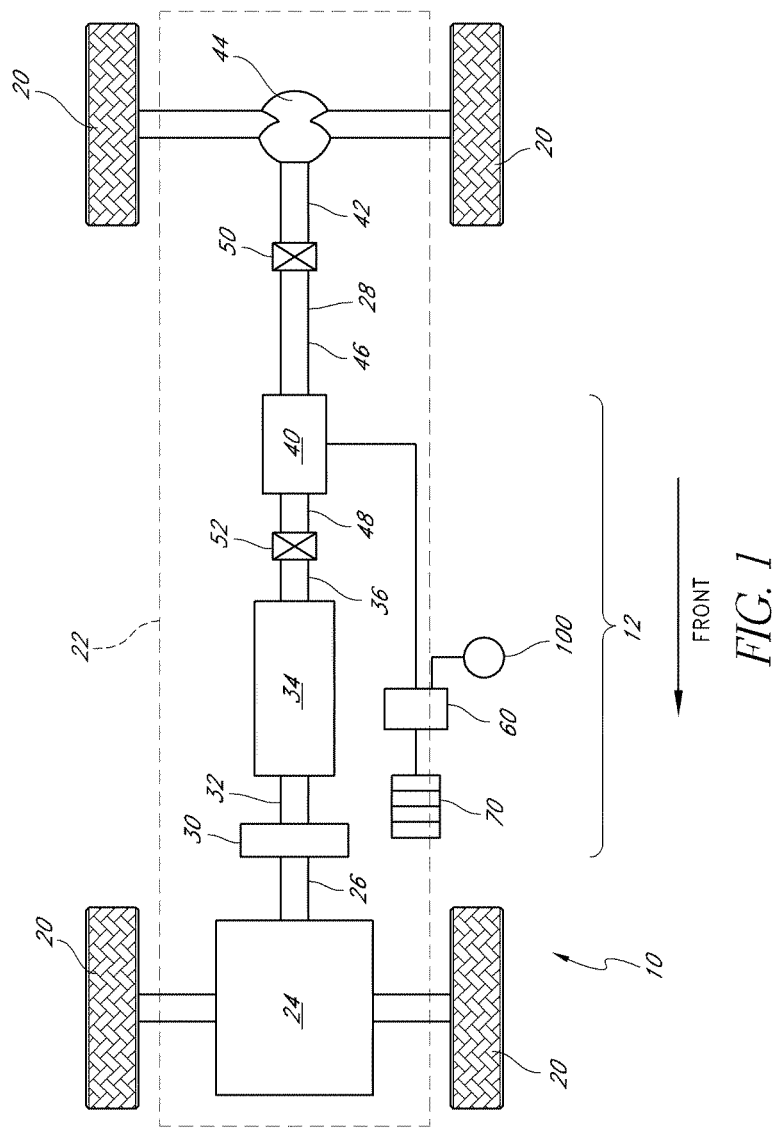
FIG. 1 is a schematic diagram of a manually operated hybrid vehicle.

With reference now to FIG. 1, a vehicle 10 is schematically illustrated. The vehicle 10 comprises a hybrid system 12 arranged and configured in accordance with certain features, aspects and advantages of the present invention. The system 12 advantageously allows regenerative energy to be stored and later converted to mechanical energy to propel the vehicle 10. The system 12 can be used at the vehicle user's discretion during such events as deceleration, downhill braking, braking, acceleration, uphill climbs and steady state operation. Some embodiments provide methods of simplified control for the initiation and magnitude of collecting regenerative electric power generated by a driveline mounted motor/generator at the transmission, which power then can be stored in capacitors. Some embodiments provide methods of converting the power stored in capacitors into propulsion mechanical energy for use in hybrid vehicles.

The system 12 preferably is manually activated and deactivated in a sequential manner by a user of the vehicle 10. The system 12 is believed to be particularly advantageous in an urban "stop and go" environment of use. As used herein, "manually" is intended to have its ordinary meaning and to mean "operated by human effort rather than by a machine or a computer" and includes arrangements that allow operation by a hand, a foot, another body part of a human or some combination of these.

The use of the human judgment factor to manipulate the operating modes of the system 12 in lieu of the usual more complicated, troublesome, and expensive automated installations can improve extraction of available inertia energy of the vehicle mass during deceleration in the simplest manner. It also promotes intelligent reuse of the stored electrical energy to contribute to the vehicle's primary power source during acceleration and short steady state speed conditions until its depletion.

The system 12 is believed most valuable for, but not limited to, use in commercial high gross weight vehicles such as loaded delivery trucks with a repeated "stop and go" operation mode and where drivers can be motivated to conserve fuel and extend the life of the brakes. The system 12 generally is intended for, but not limited to, multicyclic charge/discharge events where sustained electrical propulsion with a large storage capacity is not required, i.e. it is expected the driver will immediately use the stored power after a stop in anticipation of the next stop. For example, in some embodiments, the operator can determine when to charge and discharge the energy storage components such as during deceleration, downhill braking and subsequent acceleration and steady state operation.

The system 12 as shown is not integrated with other vehicle systems that are operated normally as an engine dominant system as if there is no ancillary equipment. Thus the complications of such integrations are completely bypassed although some advantageous connection is possible in some embodiments. For instance, the system can be used with the existing vehicle DC electric power system. By maintaining the system generally separate of normally existing vehicle electrical components, any electrical failures of the system 12 will not prevent the normal operation of the vehicle 10.

Figure 2:
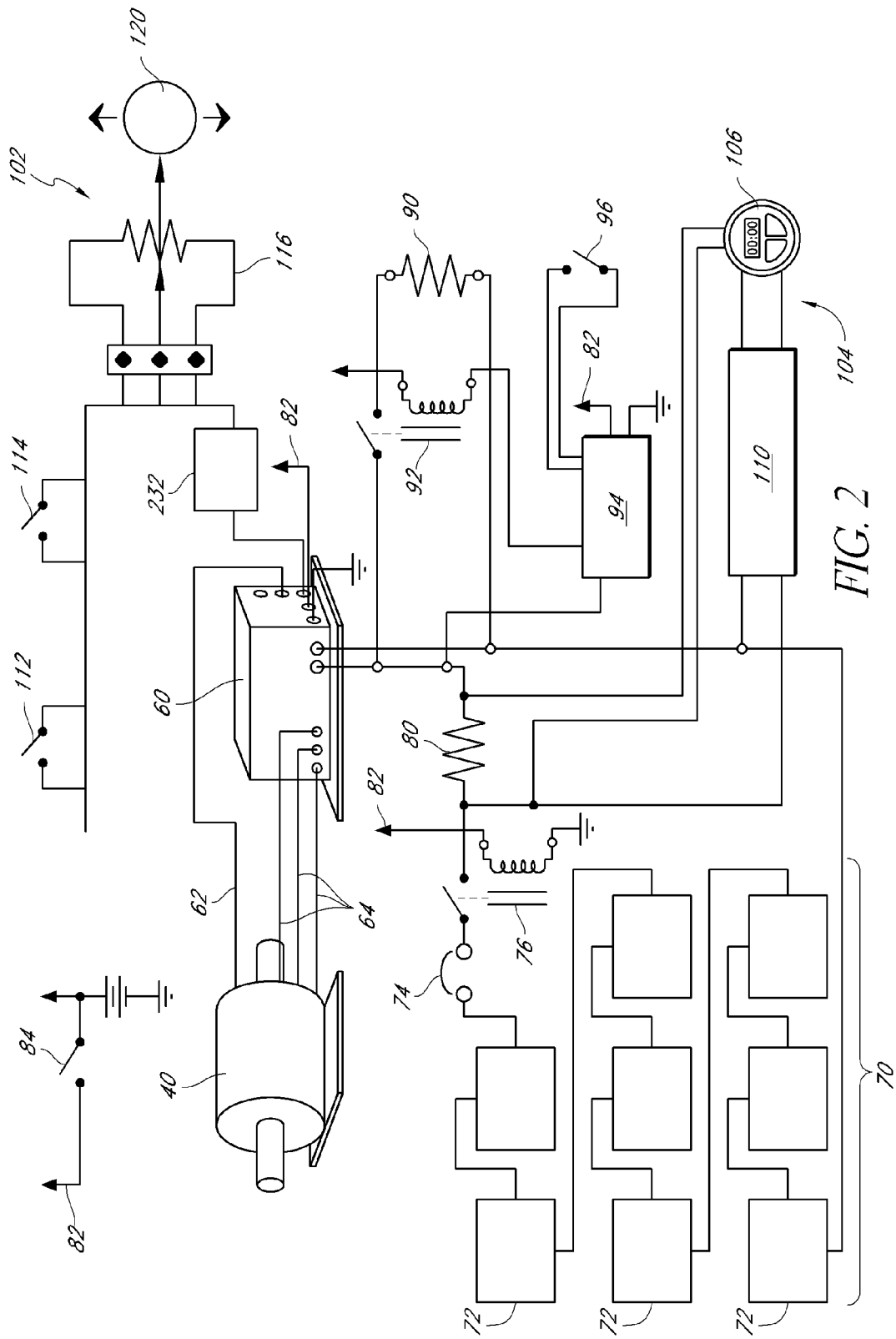
FIG. 2 is a more detailed schematic diagram of a manually operated hybrid vehicle.

The system 12 as shown in FIG. 1 and FIG. 2 can be a practical retrofit package for many existing vehicles without disturbing the existing vehicle functions. The more detailed view of the system of FIG. 2 shows a preferred version of the system 12 that has been prepared for a test vehicle of about 10,000 lb. gross weight.

With reference now to FIG. 1, the vehicle 10 can be any suitable type of vehicle. In one application, the vehicle 10 comprises at least two wheels 20. The vehicle 10, however, can comprise as few as one wheel 20 or more than four wheels 20. The illustrated vehicle 10 comprises four wheels 20. In some applications, the vehicle may use tracks or other propulsive mechanisms. The wheels 20 can support a body or other vehicle structure 22 in any suitable manner. Because such configurations are well known, further description is not necessary.

The vehicle 10 preferably comprises an engine 24. The engine 24 can be of any suitable configuration and the engine preferably is the dominant source of motive power for the vehicle 10. While the illustrated vehicle 10 comprises a front mounted engine 24, the engine 24 can be positioned in any desired location of the vehicle 10.

An engine output shaft 26 transfers the power of the engine 24 to the driving wheels 20 with a drive line 28. In one configuration, the engine output shaft 26 extends to a power interrupting member 30, such as a clutch or a torque converter. A transmission input shaft 32 connects a transmission 34 to the power interrupting member 30. The power interrupting member 30 allows the engine output shaft 26 to turn while the wheels 20 and the gears in the transmission 34 are stopped. It should be noted that, as used herein, "input" and "output" are used in reference to operation of the system in motor mode; in generator mode, the "input" shaft serves as an output shaft of the system while the "output" shaft serves as an input shaft of the system (e.g., inputting mechanical energy into the generator system).

The transmission 34 can be any suitable type of transmission, including but not limited to a continuously variable transmission, a manual transmission, an automatic transmission, or an automated manual transmission. The transmission changes the rotational speed of a transmission output shaft 36 relative to the transmission input shaft 32 in any suitable manner. Because the construction and operation of transmissions are well known, further description of the transmission 34 is not needed.

The transmission output shaft 36 is connected to an electric machine 40. The electric machine 40 can be any suitable motor/generator. The electric machine 40 preferably comprises an induction machine; however, other electric machines could be used including, but not limited to, permanent magnet motors, synchronous motors and separately excited DC motors.

In one configuration, the electric machine 40 is a three phase A. C. electric motor/generator. In another configuration, the electric machine 40 is a motor/generator commercially available from Azure Dynamics and identified by the model number AC55. The AC55 motor/generator is a single output, 78 kW 3-phase AC induction motor/generator with a nominal speed of 2500 rpm and a maximum speed of 8000 rpm. Preferably, the motor/generator comprises an operating range of between about 330 and about 380 volts. As stated above, other electric machines also can be used.

In a preferred configuration, the electric machine 40 is mounted to the drive line (e.g., the transmission output shaft 36). The preferred AC55 Azure Dynamics motor/generator weighs in excess of 200 pounds and therefore cannot be adequately supported by the drive line alone. Thus, a suitable mounting assembly can be used such that the electric machine 40 is mounted to a portion of the vehicle structure 22 between the transmission output shaft 36 and an input shaft 42 of a differential 44 or other intervening shaft. In one embodiment, the electric machine 40 is secured to the frame 22 of the vehicle 10 while an output shaft 46 of the electric machine 40 is coupled with a universal joint 50 to the input shaft 42 of the differential 44 (or some other intervening shaft) while an input shaft 48 of the electric machine 40 is coupled to the output shaft 36 of the transmission 34 by another universal joint 52. In some embodiments, the electric machine 40 is rigidly mounted to the transmission 34 (e.g., on the transmission case) at the end corresponding to the transmission output shaft 36.

The electric machine 40 preferably is mounted to the output shaft 36 of the transmission 34. Accordingly, the electric machine 40 preferably has integral bearings and a double ended high strength shaft capable of carrying the vehicle transmission maximum torque from its input end, including its own generated torque, to its output end. In other words, the shaft of the electric machine 40 should be capable of withstanding the torque loading expected to be encountered when the shaft is positioned between the output of the transmission 34 and the wheels 20. In one configuration, the stock electric motor/generator shaft can be replaced with a stronger shaft. In a preferred configuration, the stock electric motor/generator shaft can be replaced with a resized shaft (e.g., enlarged) formed of an alloy steel, such as 300M or 4140. Other materials also can be used keeping in mind the large torque loads to be encountered.

The electric machine 40 can be co-axial with the drive line 28 or can be offset from the drive line 28 to accommodate a belt drive. As shown, the electric machine 40 is mounted to the vehicle structure 22 with the universal joints 50, 52 at each end to integrate the electric machine 40 into the drive line 28.

With reference now to FIG. 2, electric motor controller 60 controls the amount of power, torque and/or current supplied to and from the electric machine 40 based upon one or more input signals. As shown, the electric motor controller 60 is electrically connected to the electric machine 40. A feedback communication line 62 extends between the electric machine 40 and the motor controller 60 as do the power supply lines 64. AC power is transferred between the electric machine 40 and the motor controller 60 through the power supply lines 64 and signals to control the electric machine 40 pass through the feedback communication line 62 in the illustrated configuration.

The motor controller 60 may comprise one or more microprocessors, transducers, power semiconductors, capacitors or any combinations of these components. In one configuration, the motor controller 60 is formed of commercially available digital motor controllers from Azure Dynamics of Woburn, Mass. identified by part numbers DMOC445 and DMOC445LC. These motor controllers 60 are DSP-controlled, waterproof inverters for controlling 3-phase AC motors and generators. The 445LC is a liquid cooled version of the 445.

The electric motor controller 60 processes the AC output of the electric machine 40 and converts the AC output into DC current suitable for charging an energy storage system 70. The electric motor controller also processes DC output from the energy storage system 70 and converts the DC output into AC power for supply to the electric machine 40 under widely varying voltage changes. Furthermore, the electric motor controller 60 can provide overvoltage and undervoltage protection while performing other functions as desired for particular applications.

The energy storage system 70 preferably comprises batteries or other forms of energy storage components, such as ultracapacitors 72. In some configurations, the energy storage system 70 can comprise a plurality of ultracapacitors 72 wired in series, in parallel or in a combination of series and parallel. Suitable ultracapacitors 72 are commercially available from Maxwell Technologies of San Diego, Calif.

The energy storage system 70 could comprise ultracapacitors, supercapacitors, double-layer capacitors (DLC), other devices that store a static charge or any combination of these components. In some less desirable embodiments, batteries can be used separately or in combination with any of the components listed above. Ultracapacitors (or other forms of capacitors) are preferred, however, in order to achieve more efficient charge/discharge cycles and in order to extend the life of the system. In one preferred configuration, after an initial charge, using capacitors requires no scheduled maintenance or recharging and the system is expected to last the life of the vehicle under normal frequent use.

In one preferred configuration, the energy storage system 70 comprises a capacitor bank with a sufficient electrical storage capacity to absorb the energy of only one major braking event. In another configuration, the energy storage system 70 has a voltage range and a useable storage capacity to absorb the generated energy of at least one major deceleration event. In some configurations, the capacity is about 400 volts with each ultracapacitor 72 having an operating voltage of about 2.7 volts. Other values also can be used. While more electrical storage capacity can be provided (e.g., sufficient to store the energy of multiple major braking events), the lower electrical storage capacity provides suitable storage for use in an stop and go environment while reducing the weight associated with the energy storage system 70 and reducing the costs associated with the energy storage system. Preferably, the energy stored is dispensed through operation of a motor (e.g., an electric traction motor), which converts the energy into mechanical power with minimal voltage excursion between the extremes. In some embodiments, an AC motor can be used that features an operating range between about 330 and 380 volts. The stored electrical energy in the capacitor bank below the operating voltage remains unused.

In some embodiments, the energy storage system 70 can comprise batteries, instead of or in addition to capacitors, which batteries are portable and removable when used with quick disconnect devices. Such disconnect devices preferably are generally waterproof. Such an installation allows a quick battery exchange if desired that can be used in concert with a battery exchange depot. The batteries can be single or multiple.

In the illustrated configuration, the energy storage system 70 is connected to the electric motor controller 60 via a breaker or fuse 74, a relay 76 and a shunt 80. The breaker or fuse 74 preferably is a 250 amp, 400 volt breaker to protect the hybrid system 12 in the event of a power supply problem. The relay 76 is connected to a key circuit 82 such that when a key switch 84 is closed (e.g., the user inserts a key and closes the key switch 84) then the relay 76 closes to connect the electric motor controller 60 and the energy storage system 70. One presently preferred relay is an EV200HAAANA. The shunt 80 is used to provide information about current flow such that energy usage can be monitored, output to the user and used by other components of the system, as will be described. One presently preferred shunt 80 is an SH2516 shunt.

An electric load bank 90 is provided to dissipate electrical energy from the vehicle while allowing the electric machine 40 to maintain brake torque at the wheels 20 even when the electric machine 40 has substantially fully charged the energy storage system 70. In other words, the electric load bank 90 can absorb the output of the generator and act as a silent downhill retarder. The heat produced simply is dissipated into the surrounding atmosphere. This energy absorbing method can be used for extended periods and can be used when the batteries and/or capacitors are fully charged.

The electric load bank 90 comprises one or more resistors connected in series, in parallel or in a combination of series and parallel. In the preferred embodiment, the electric load bank 90 comprises electrical resisters that transfer electrical energy into heat energy. The electric load bank 90 can be a 10 ohm, 15 kwatt load bank. Other devices that convert electrical energy into heat energy could be used. In addition, other devices that can dissipate electrical energy can be used alone or in combination with devices that convert electrical energy into heat energy.

In the illustrated configuration, the electric load bank 90 can be connected to and disconnected from the rest of the system 12 through a relay 92. One presently preferred relay is an EV200HAAANA. The relay 92 is controlled by an electric load bank controller 94. Any suitable electric load controller 94 can be used. As illustrated, the load controller 94 preferably is supplied by power when the key switch 84 is closed. Other configurations are also possible.

The preferred load bank controller 94 measures a voltage of the energy storage system 70 and preferably employs hysteretic control to connect and disconnect the load bank 90 to and from the energy storage system 70. When the measured voltage is equal to or greater than an upper set-point voltage, Vhigh (volts), the electric load bank controller 94 connects the electric load bank 90 to the energy storage system 70. When the load bank 90 is connected and the voltage becomes less than a lower set-point, Vlow (volts), the electric load bank controller 94 disconnects the electric load bank 90 from the energy storage system 70.

Thus, the electric load controller 94 automatically connects and disconnects the electric load bank to and from the energy storage system 70 as needed or desired with the relay 92. Other configurations also can be used. Thus, the system 12 can maintain electrical generation through the electric machine 40 even if the energy storage system 70 is fully charged. With continued reference to FIG. 2, an additional switch 96 also can be provided to discharge the energy storage system 70 through the electric load bank prior to maintenance or repair operations. Other energy dumping configurations also can be used.

The system 12 also comprises a vehicle user interface 100. The user interface 100 can communicate with the system 12 in a wired or wireless configuration. The vehicle user interface 100 is the central unit that the user or driver uses to control and monitor vehicle parameters. The preferred user interface 100 comprises a manual control member subsystem 102 and a metering subsystem 104. In some configurations, the metering subsystem 104 may be omitted.

The metering subsystem 104, when present, can be used to display the voltage and/or the electrical current of the energy storage system. In this manner, the user can determine the operating characteristics of the energy storage system. The metering subsystem 104 comprises a meter 106 that is electrically connected to the shunt 80 and to another portion of the system through a voltage prescaler 110. The two connections allow the meter to display the volts, amps. amp hours and operating time remaining. The two connections also allow the meter to measure and report kilowatt hours and historical battery information such as the number of charge cycles, the deepest discharge and the average depth of discharge. The prescaler 110 allows the meter 106 to monitor up to 500 volts of charge in the energy storage system 70. A preferred voltage prescaler 110 is identified by part number IN2534, which is available for the Link-10 meter, which was formerly known as the E-Meter, available from Xantrex Technology, Inc. of British Columbia, Canada.

The manual control member subsystem 102 allows the user to control the electric machine 40 as desired. As shown in FIG. 2, a forward switch 112 and an interlock switch 114 can be provided along with a potentiometer 116. The manual control member subsystem 102 allows the user to switch from a motor operation to a generator operation or neutral. The manual control member subsystem 102 can be an on/off type or can provide for user modulation (e.g., control the degree to which the system operates). Thus, in one configuration, the manual control member subsystem 102 comprises the potentiometer 116 or other suitable configuration that allows a user to control the electric machine 40 between motor and generator functions in proportion to the degree to which a control actuator 120 of the manual control member subsystem 102 has been manipulated.

For instance, a slight movement of the control actuator 120 (e.g., knob) toward the motor direction (D in FIG. 3) causes a lower torque of motor operation while a large movement of the control actuator 120 toward the motor direction (D in FIG. 3) causes a higher torque of motor operation. When the vehicle 10 is accelerating or moving at a constant velocity forward, the user may use the manual control member subsystem 102 to command the electric machine 40 to act as a motor. When the user wants to decelerate the vehicle 10, the user can use the manual control member subsystem 102 to switch the electric machine 40 to power generation. Thus, the user can control when electrical energy is generated and used, the user can control how much electrical energy is generated and used, and the user can control how quickly the electrical energy is generated and used.

Figure 3:
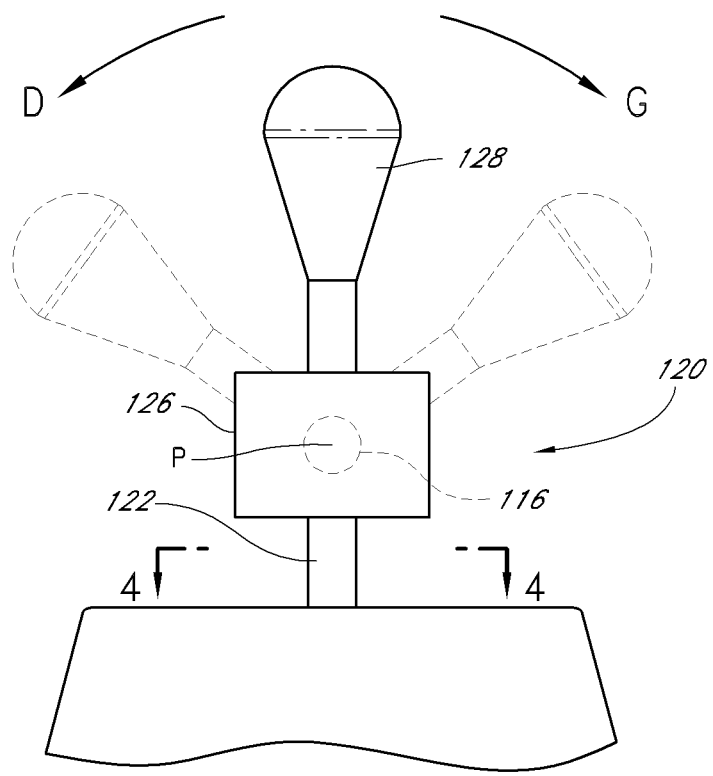
FIG. 3 is an elevation view of a gear shift usable in connection with the manually operated hybrid vehicle.
Figure 4:
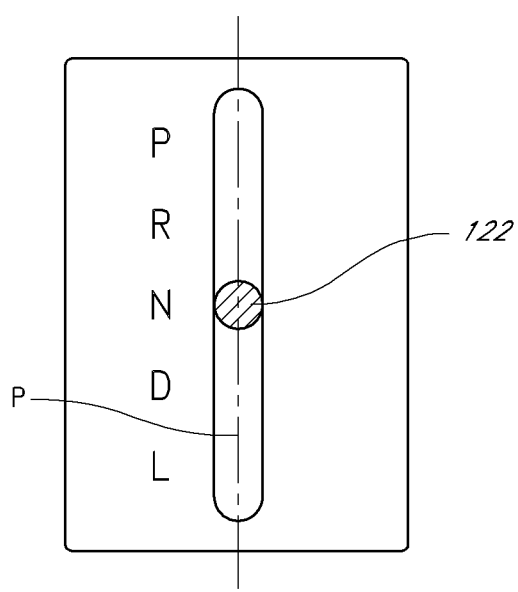
FIG. 4 is a top plan view of the gear shift of FIG. 3 taken along the line 4-4 in FIG. 3.

As shown in FIG. 3, the control actuator 120 can be installed on a gear shift lever 122 or the control actuator can be conveniently placed elsewhere. In one configuration, the gear shift lever 122 can be moved fore and aft to change gears while the control actuator 120 can be toggled left (D) and right (G), for example, to control the electric machine 40. Movement in the D direction employs the motor to assist with moving the vehicle while movement in the G direction employs the generator to assist with retarding vehicle movement. Thus, in the configuration shown in FIG. 3, the shift lever 122 and the control actuator 120 allow both to be operated at the same time with a single basic movement. Other configurations are possible. In some embodiments, the control actuator 120 is spring loaded to return to a neutral position when released. With reference to FIG. 3, the control actuator 120 preferably comprises a housing 126 and a handle 128 that can pivot about an axis P that preferably aligns with the movement direction of the gear shift lever 122. The potentiometer 116 or the like can be used to determine the position of the handle 128 and to provide user input to desired operation of the system 12.

Figure 5:
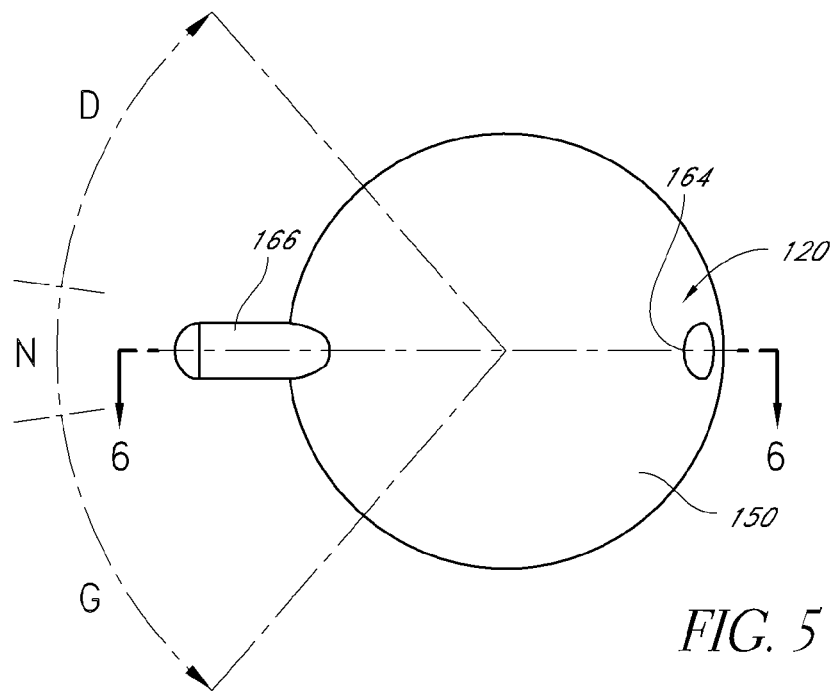
FIG. 5 is a top plan view of another gear shift usable in connection with the manually operated hybrid vehicle.
Figure 6:
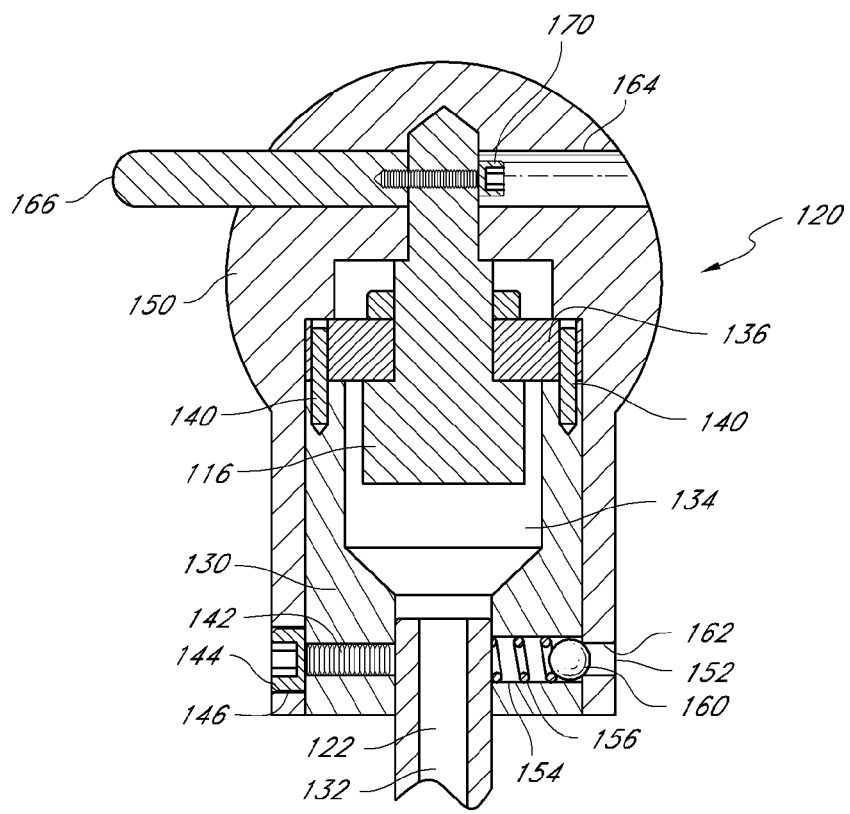
FIG. 6 is a sectioned elevation view of the gear shift taken along the line 6-6 in FIG. 5.

In some applications, such as that illustrated in FIGS. 5 and 6, the control actuator 120 and/or the potentiometer 116 can be integrated into a handgrip of the gear shift lever 122 such that the control actuator 120 can be rotated clockwise and counterclockwise rather than toggling left and right. In some embodiments, the control actuator 120 is spring loaded to return to a neutral position when released. With reference to FIG. 6, a body 130 can be mounted to the shift lever 122. In some configurations, the shift lever 122 is generally hollow and defines a lumen or passageway 132.

The body 130 can be secured to the shift lever 122 in any suitable manner. In one configuration, the body 130 is threaded onto the shift 122. Preferably, the body 130 does not rotate relative to the shift lever 122 once secured thereto. The body 130 can be formed of any suitable material. In one preferred configuration, the body 130 is formed of a 6061 aluminum alloy.

The body 130 preferably comprises a cavity 134. The cavity 134 can be centrally positioned and preferably opens to the outside of the body 130. In the illustrated configuration, the cavity 134 is generally cylindrical with an axis that generally aligns with the shift lever 122. The cavity preferably is substantially closed by a mounting base 136. The mounting base 136 can be secured in position with fasteners, pins or the like. In the illustrated configuration, the mounting base 136 is secured to the outer walls of the body 130 with pins 140.

The base 136 can be formed of any suitable material. In one preferred configuration, the base 136 is formed of a 6061 aluminum alloy. The potentiometer 116 is secured to the mounting base 136. Accordingly, a portion of the potentiometer 116 is positioned within the cavity 134 and a portion of the potentiometer 116 extends upward relative to the mounting base 136.

A lower portion of the base 130 comprises a threaded bore 142 that receives a fastener 144, a pin or the like. The threaded bore 142 can be counterbored, if desired. The fastener 144 slides within a circumferential passageway 146 that extends slightly more than 90 degrees around the circumference of a grip 150 in the illustrated configuration. The passageway 146 can extend around more or less of the circumference as desired. The fastener 144 defines a stop to limit the twisting travel of the grip 150 relative to the body 130. Other suitable travel stop configurations also can be used.

A detent assembly 152 also can be provided. In the illustrated detent assembly 152, a bore 154 is defined in the body 130. In some embodiments, the bore 154 can be aligned with the threaded bore 142 to simplify the manufacturing process. A compression spring 156 can be positioned in the bore 154 and a ball 160 can be pressed against the spring by the grip 150. The grip 150 can comprise a recess or an opening 162 such that the ball 160, when aligned with the opening 162, is urged into engagement with the opening 162 to provide a positive locator for a neutral mode (i.e., not in motor or generator mode) for the hybrid system.

The grip 150 can be formed of any suitable material. In one configuration, the grip 150 is formed of black nylon. As illustrated, the grip 150 preferably comprises a through bore 164 that receives a portion of a pin 166. The pin 166 can be formed of any suitable material, such as stainless steel, for example but without limitation. The pin 166 can be secured to the potentiometer 116 in any suitable manner. In one configuration, a threaded fastener 170 secures the potentiometer and the pin 166 together. The pin 166 advantageously couples the grip 150 to the potentiometer 116 for rotation and the pin 166 advantageously provides a visual confirmation of the angular orientation of the grip 150.

In the illustrated configuration, rotating the grip 150 relative to the body 130 in a clockwise direction commands a motor operation while rotating the grip 150 relative to the body 130 in a counterclockwise direction commands a generating operation. A small range of motion preferably results in neither motor operation nor generating operation. More preferably, the degree to which the motor torque is applied (or the generator generates electrical power) depends upon the degree to which the grip 150 is rotated relative to the body 130.

Figure 7:
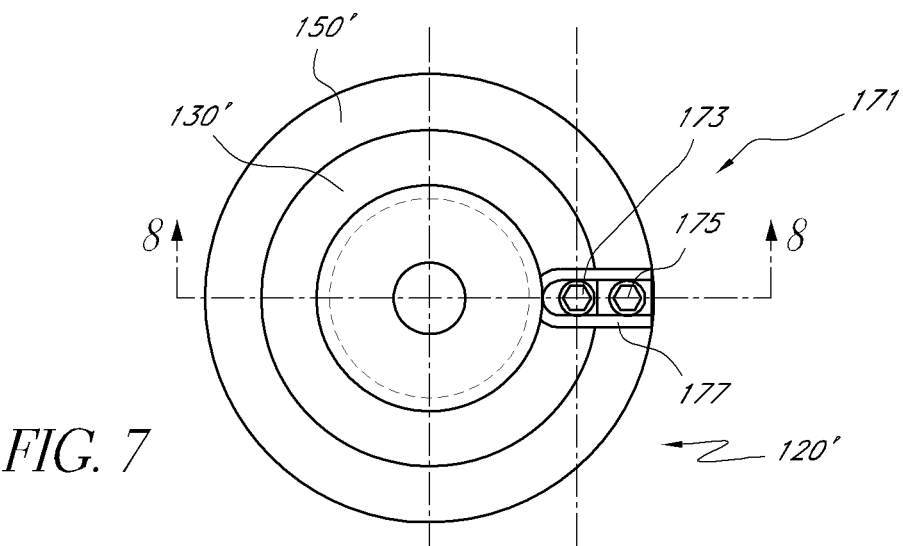
FIG. 7 is a bottom plan view of another gear shift usable in connection with the manually operated hybrid vehicle in which the shift knob has a spring biased configuration.
Figure 8:
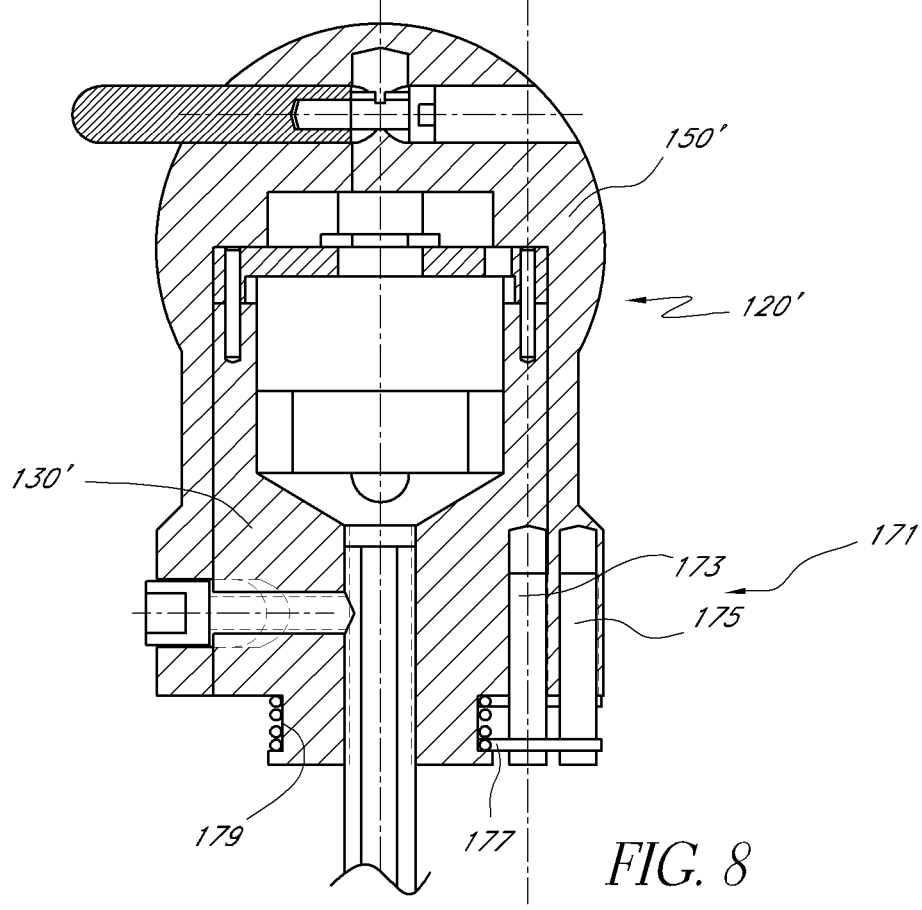
FIG. 8 is a sectioned elevation view of the gear shaft taken along line 8-8 in FIG. 7.

With reference to FIGS. 7 and 8, a control actuator 120' is shown that is similar in almost all respects to the control actuator 120 shown in FIGS. 5 and 6. The primary changes reflected in the control actuator 120' shown in FIGS. 7 and 8 are (1) the removal of the detent assembly 152 and (2) the incorporation of a spring biasing assembly 171. In the illustrated configuration, the spring biasing assembly 171 generally comprises a first post 173, a second post 175 and a torsion spring 177. The first post 173 is mounted generally in line with the second post 173. In other words, the first post 173 and the second post 175 preferably are intersected by a single radially extending plane when under the effect of the torsion spring 177.

In the illustrated control actuator 120', a small diameter recess 179 is created along a portion of the body 130'. A flange 181 is formed at the lower end of the illustrated recess 179. The torsion spring 177 is received within the recess 179 can secured therein at least in part by the flange 181. Other configurations for mounting a biased return also can be used.

In the illustrated configuration, an opening is formed in the base 130' to receive the first post 173. Other mounting configurations for the first post 173 also can be used. Moreover, in some configurations, the torsion spring may be directly connected to the base 130' such that the post can be omitted. In addition, the grip 150' also comprises an opening that receives the second post 175. Again, other mounting configurations for the second post 175 also can be used and, in some configurations, the torsion spring may be directly connected to the base 130' such that the post can be omitted.

As illustrated, the two posts 173, 175 are mounted respectively to a stationary component and a moveable component. As the moveable component (e.g., the grip 150') rotates about the stationary component (e.g., the base 130') in a first direction, a first end of the torsion spring 177 is displaced relative to a second end of the torsion spring 177 because the first end of the torsion spring 177 is moved by the second post 175 while the second end is held relatively stationary by the first post 173. Similarly, when the moveable component rotates about the stationary component in a second direction, the second end of the torsion spring 177 is displaced relative to the first end of the torsion spring 177 because the second end of the torsion spring 177 is moved by the second post 175 while the first end is held relatively stationary by the first post 173. Other configurations are possible.

Figure 9:
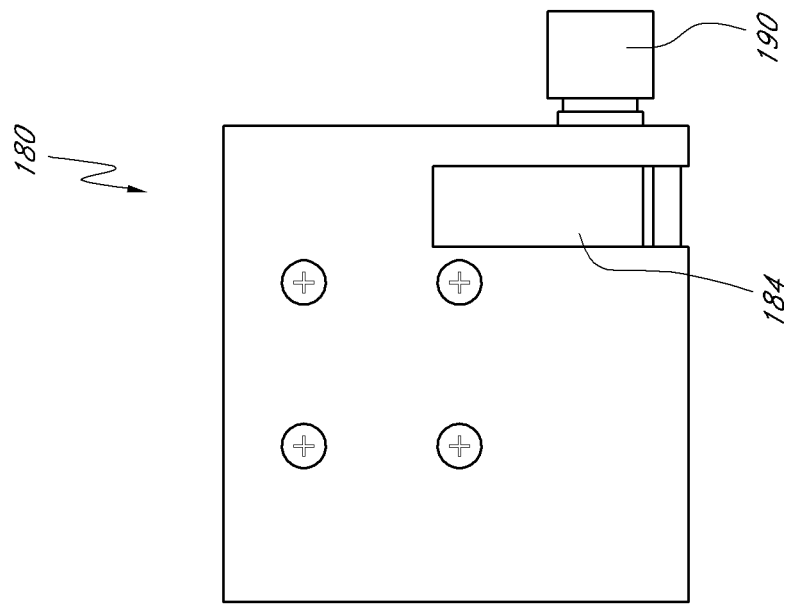
FIG. 9 is a simplified view of an embodiment of a brake pedal and an embodiment of an accelerator pedal adapted for use with the systems described herein.
Figure 9:
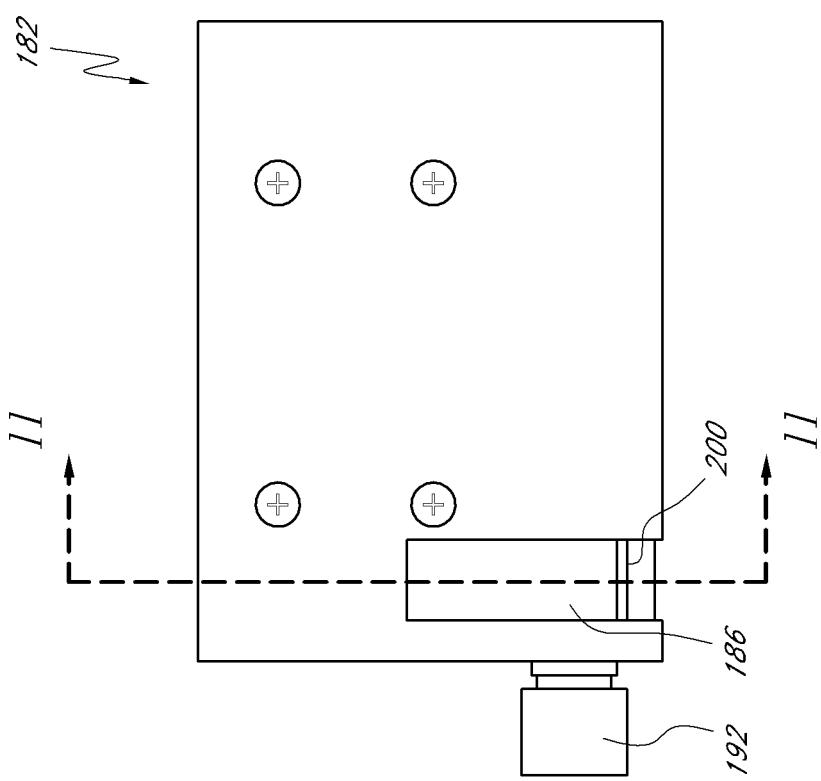
Figure 10:
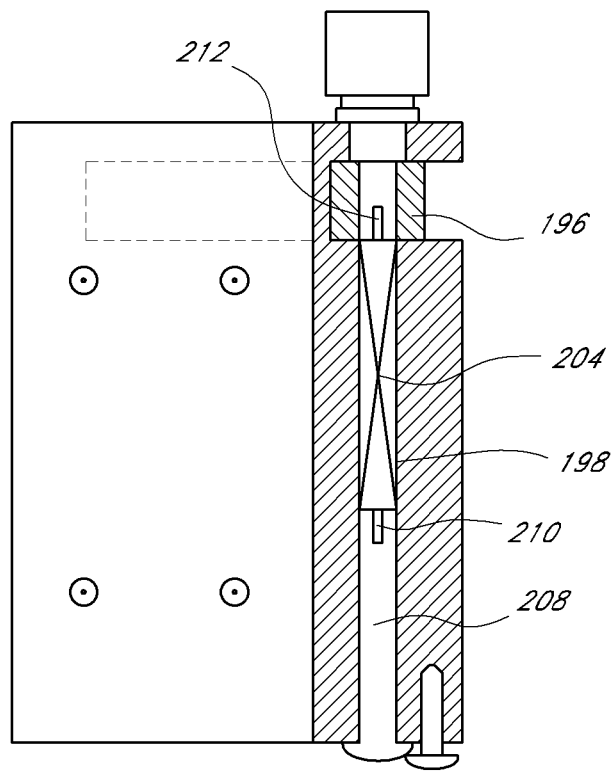
FIG. 10 is a sectioned bottom view of the brake pedal of FIG. 9 showing a trigger mounting configuration.
Figure 11:
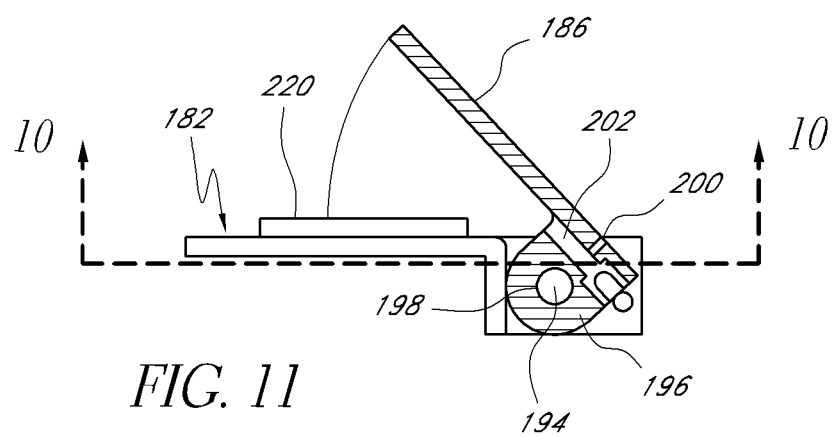
FIG. 11 is a sectioned side view of the brake pedal of FIG. 9 showing a range of trigger movement.

Other configurations also are possible. For example, the control actuator 120 can be a two part device incorporated with a foot operated throttle pedal 180 and/or a brake pedal 182 and depressed in tandem without the need for sensors of any kind. Such a foot actuated construction is illustrated in FIGS. 9-11. The foot actuated constructions 180, 182 can be used as a supplement to the hand controls also discussed herein. In some embodiments, the hand control 120 may control the regeneration and the motive power in a single unit while, in some embodiments, the foot actuated constructions 180, 182 may separately control the regeneration with one foot pedal 180, 182 and the motive power with another foot pedal 180, 182. Thus, for example, regeneration can be controlled with the brake pedal 182 and motive power application can be controlled with the accelerator pedal 180 such that a hands-free operation is provided that can be used in a normal "stop and go" driving mode.

With reference to FIG. 9, the accelerator pedal 180 preferably comprises a motive power trigger 184 while the brake pedal 182 preferably comprises a generation trigger 186. The motive power trigger 184 controls the position of an accelerator potentiometer 190 and the generator trigger 186 controls the position of a brake potentiometer 192. Thus, one or both of the triggers preferably is moveable through a range of movement and the range of movement can indicate a degree to which the electric machine 40 applies the motive power or the degree to which the electric machine 40 generates power (and causes a braking effect).

The trigger-potentiometer constructions can be further understood with reference to the cutaway views of FIGS. 10 and 11. Preferably, the triggers 184, 186 are positioned to or toward a peripheral side of the associated pedal 180, 182. In other words, in most embodiments, the triggers 184, 186 are not positioned centrally on the associated pedal 180, 182 and, in most embodiments, sufficient surface area remains on the associated pedal 180, 182 such that the pedal 180, 182 can be operated without any manipulation of the associated trigger 184, 186.

The sizing and/or positioning of the triggers 184, 186 are desired because there are some operational modes in which operation of the triggers 184, 186 need not occur while operation of the associated pedal 180, 182 is desired. Thus, the illustrated side mounted constructions allow independent operation of the pedal 180, 182 from the triggers 184, 186. For example, when the transmission 34 is shifted to reverse, the motive power trigger 184 typically would not be depressed because the electric motor 40 in some embodiments is only used to drive the associated vehicle 10 forward. Similarly, when the transmission 34 is in neutral and the engine 24 is accelerated for whatever purpose, again the motor 40 preferably would not be actuated. In addition, with respect to the brake pedal 182, the trigger 186 typically would not be actuated when the transmission 34 was in reverse and the brakes are being used to stop the vehicle 10. In addition, the trigger 186 on the brake pedal 182 typically would not be actuated when the vehicle 10 is being maneuvered around a parking lot, for example, or during other low speed operation of the vehicle 10. Other configurations also can be used.

With reference to FIG. 11, the trigger 186 preferably clamps onto a shaft 194 of the potentiometer 190, 192. In the illustrated configuration, a boss 196 extends from a portion of the trigger 186. A passageway 198 is defined by the boss 196 and a slot 200 intersects the passageway. A threaded fastener 202 bridges the slot 200. The threaded fastener 202 threads into an opening at the end away from the head of the threaded fastener 202 and the head of the threaded fastener 202 abuts against a shoulder such that tightening of the threaded fastener 202 clamps the trigger 186 onto the shaft 194. Other configurations also can be used.

With reference to FIG. 10, the passageway 198 can accommodate a biasing member 204. In the illustrated configuration, the passageway 198 accommodates a torsion spring. Other types of biasing members 204 and other biasing configurations can be used. The illustrated torsion spring 204 urges the trigger 186 to an open position (e.g., the position shown in FIG. 11) such that the trigger 186 can be depressed by a foot or the like. In the illustrated configuration, a pin 208 can have a slot 210 that accommodates a portion of the biasing member 204 and the potentiometer shaft 194 (or a shaft coupled to the potentiometer shaft 194) likewise can have a slot 212 that accommodates a portion of the biasing member 204. Other configurations are possible.

Preferably, the pedal 182 has a front surface 220 and the trigger 186 has a front surface 222 that generally align with each other when the trigger 186 is fully depressed. Other configurations are possible. As shown, the trigger 186 preferably can be moved through a range of movement with the fully depressed trigger 186 corresponding to the front surface 222 of the trigger being generally aligned with the front surface 220 of the pedal 182. In some configurations, the pedal 182 will not begin movement until the trigger 186 has completed its range of movement. Preferably, when the trigger is depressed, the same foot motion will additionally depress the associated pedal in tandem to achieve the desired outcome (e.g., engine power or braking).

Figure 12:
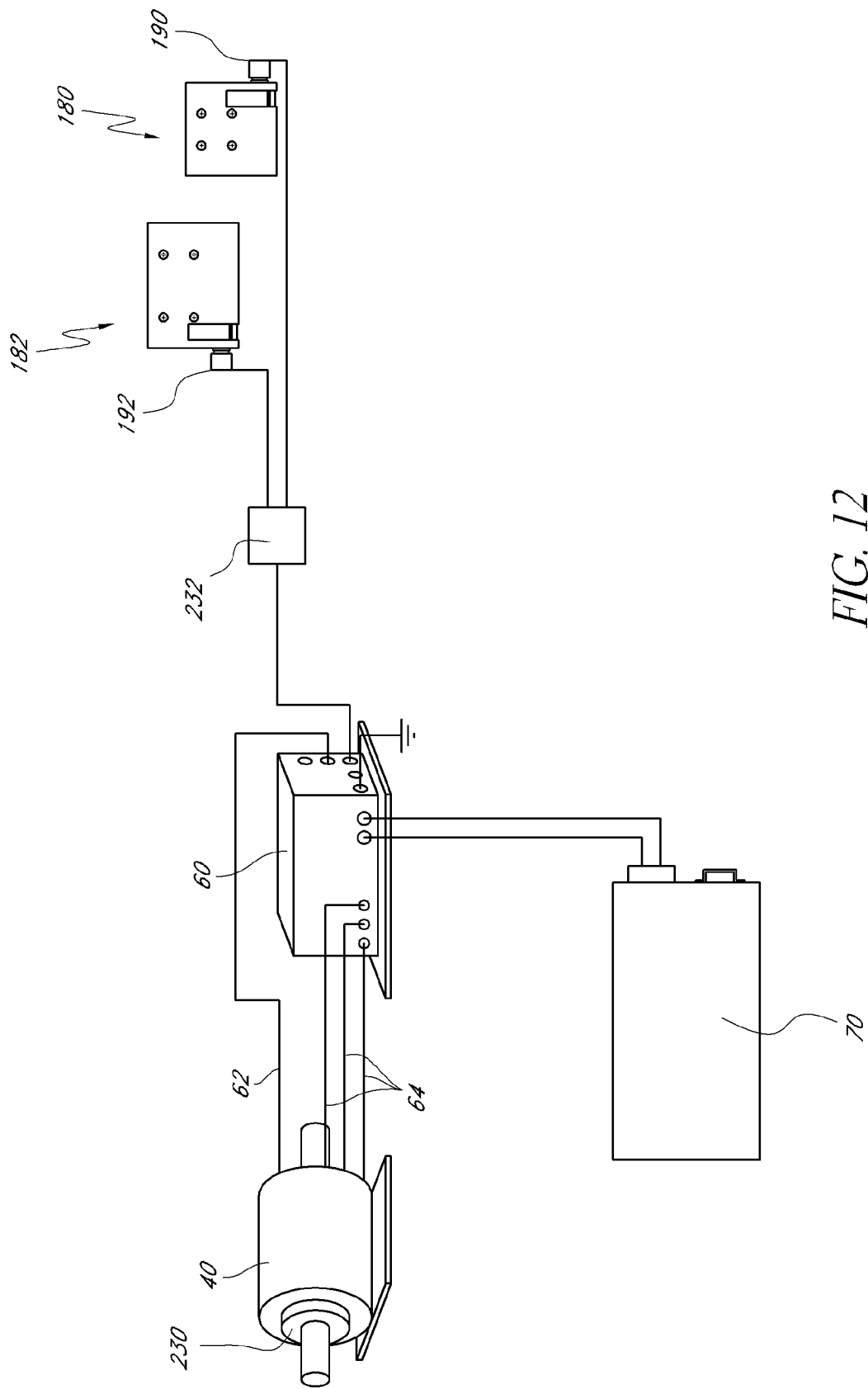
FIG. 12 is a schematic view of another manually operated hybrid vehicle.

With reference to FIG. 12, in some embodiments, the potentiometers 190, 192 can be connected to the control module 60 that uses the resistance changes of the potentiometers 190, 192 to modulate the input and the output of electrical power of the motor/generator 40. Through the use of the trigger 186 installed on brake pedal 182, an operator has the option to shift the transmission 34 into neutral or disengage the clutch in the regenerative mode to reduce or eliminate any engine braking and to thereby capture close to a maximum available energy of vehicle deceleration. In some embodiments, the engine 24 may be automatically declutched in any suitable manner. In some embodiments, a sprag type or other free wheeling clutch or coupling is used that can be modified and electrically energized to transfer torque in reverse. Other couplings also can be used. In the arrangement shown in FIG. 12, for example, a coupling 230 can be mounted integrally with the motor 40. In some embodiments featuring vehicles having a backup light or a backup alert system (e.g., beeping), the same circuit used to power the light or alert system can be used to electrically energize the coupling 230. In some configurations, a large coil (e.g., about 10 amps) can be used to lock the coupling 230 for reverse operation.

In some embodiments, the accelerator potentiometer 190 may be deactivated or electrically disconnected from the system 12 when the shift lever 122 is in the reverse position or in the neutral position. Such embodiments would reduce the likelihood of the operator from inadvertently operating the motor. Furthermore, in some embodiments, one or both of the brake and throttle potentiometers can be deactivated or electrically disconnected from the system when the vehicle speed is below a predetermined speed. In some embodiments, the predetermined speed is between about 5 miles per hour and about 20 miles per hour. In some embodiments, the predetermined speed is between about 10 miles per hour and about 15 miles per hour. In some embodiments, the predetermined speed is a speed below about 15 miles per hour. In some embodiments, the predetermined speed is about 12 miles per hour. Such a configuration reduces the likelihood of motor/generator operation at very low efficiencies, such as would be associated with the lower speeds set forth above.

With reference to FIG. 12, a controller 232 can be configured to connect to and disconnect from the motor controller 60 the potentiometers 180, 182 or related circuitry. In some embodiments, a speed sensing hysteretic switch can be used such that the potentiometers and/or related circuitry can be turned on when the vehicle speed exceeds about 15 mph, for example but without limitation, and such that the potentiometers and/or related circuitry can be turned off when the vehicle speed drops below about 12 mph, for example but without limitation. Other configurations also can be used. Preferably, the controller 232 receives information regarding the speed of the vehicle from the encoder mounted on the motor/generator shaft and the contoller 232 uses the information to electrically disconnect at least one of the potentiometers 190, 192 from the controller 60. Other configurations also can be used.

Figure 13:
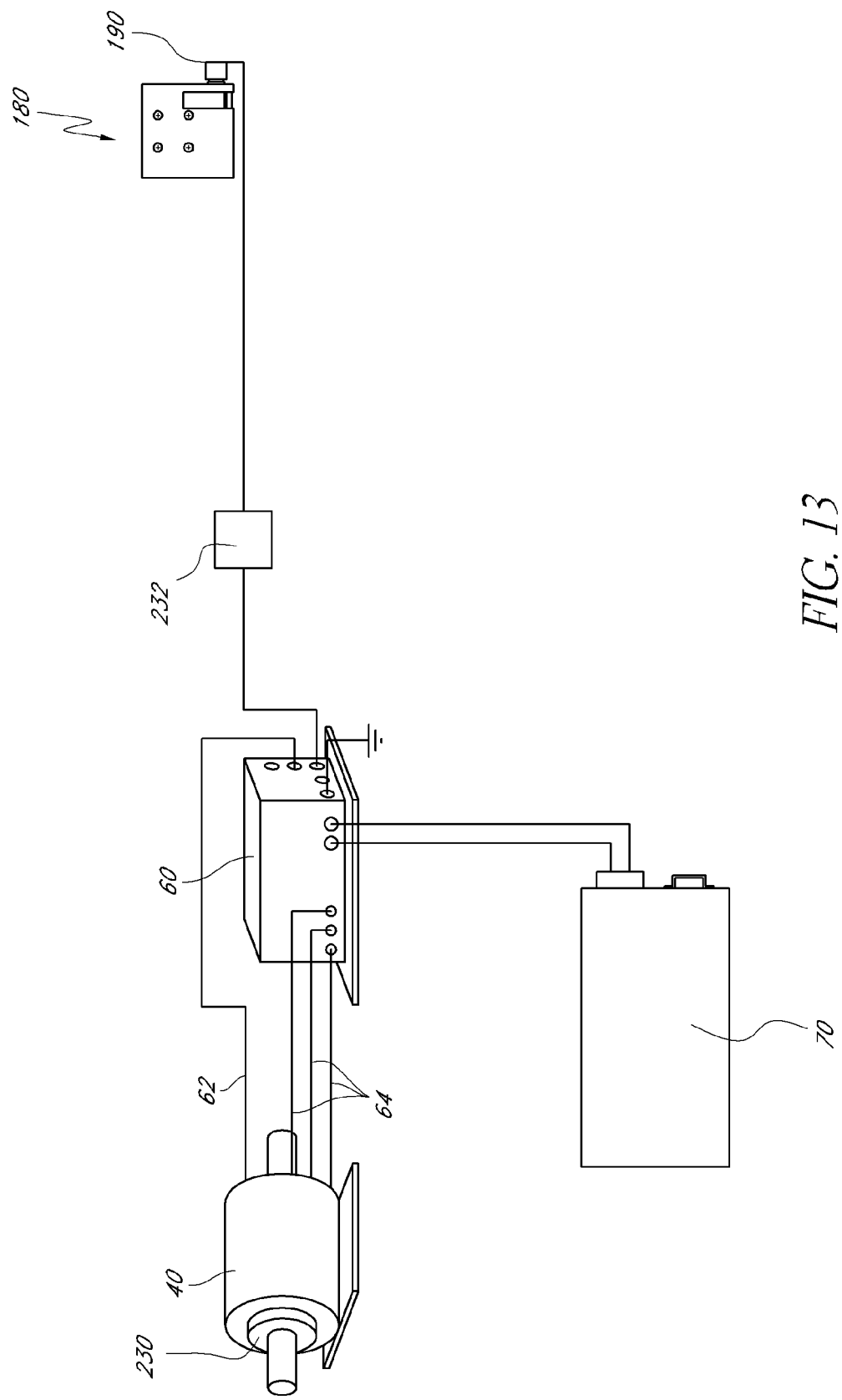
FIG. 13 is a schematic view of another manually operated hybrid vehicle.

In some embodiments, such as that shown in FIG. 13 for example, the deactivation of the circuit allows the use of a single trigger mounted on the throttle only, for example. In such an embodiment, the single trigger can be coupled with a switch or other suitable assembly such that a complete release of the trigger will result in the switch or other suitable assembly indicating that the trigger has been released. The output from the switch or other suitable assembly can be used to initiate regeneration. Such a construction enables one to use a full range of movement of the trigger (and the associated potentiometer) to control motor mode of the electric motor. In other words, slight depression of the trigger will result in low speed electric motor operation while full depression of the trigger will result in high speed electric motor operation. On the other hand, when the trigger is not depressed at all, the system can be placed into regeneration mode. The regeneration mode can begin immediately upon release of the trigger or can be delayed through suitable programming or circuitry. In some embodiments, the regeneration mode is initiated immediately upon release of the trigger.

In some configurations, the single trigger can be provided with a dual range of motion. For example, from non-depressed through partially depressed to a first angle, the system can be operating in either regeneration mode or can be simply disengaged (e.g., at speeds below a preset level), and from the first angle to a fully depressed second angle, the system can be operating in a mode using the motor to power the vehicle. In some applications, an intermediate range of motion can be provided through which the system is neither in regeneration nor in powering mode.

In one configuration, during acceleration from a stop, the trigger is depressed toward the accelerator pedal from a starting position until the trigger is full depressed. In this position, the accelerator pedal then begins to move. As the accelerator pedal moves, the engine of the vehicle begins to power the vehicle. As soon as the vehicle speed exceeds a first predetermined speed, the motor supplies additional power because the first predetermined speed has been exceeded and the trigger is fully compressed. As the motor power augments the engine power, the operator may control the combined output of the engine and the motor by feathering the accelerator pedal and/or the trigger.

In one configuration, during deceleration, the trigger and the accelerator can be feathered to slow the vehicle. Eventually, when stopping, for example, the trigger is fully released and the accelerator is fully released and the vehicle is not being powered by the engine or the motor. Under this condition, the motor is operating in regeneration mode which is slowing the vehicle. When the vehicle speed is reduced below a second predetermined speed, which may be different from the first predetermined speed discussed directly above, the regeneration ceases and the vehicle is able to coast without further regeneration-induced retardation. Other configurations also can be used.

In some embodiments, an electrical resistance bank can be provided that operates as a vehicle retarder to reduce brake wear when the capacitor bank is fully charged and the vehicle has excess dynamic energy. Preferably, the vehicle retarding function can be an automatic or substantially automatic function of the controller to maintain electrical generation when the operator control is in the regeneration position or when the brake pedal associated trigger or potentiometer is in the regeneration position. An additional manually operated switch also can be used to discharge the capacitor bank through the resistors prior to maintenance or repair operation. In some embodiments, the capacitor back simply can be disconnected.

The electric machine 40 can operate as a motor/generator to convert electrical energy to vehicle motion or as a generator to convert vehicle motion to electrical energy. The user controls the flow of energy into and out of the energy storage system 70 with the user interface 100. The user can be educated to intelligently manipulate the user interface to begin electrical energy generation and to control the generation of electrical energy up to the system maximum by slowing the vehicle without the use of the brakes or in combination with the use of the brakes. To further increase the degree of electrical energy generation, the user can disengage the clutch, or the user can shift into neutral, during deceleration such that the engine does not contribute to slowing the vehicle. Thus, even more electrical power will be generated because engine braking will be eliminated. If the control device is rigged as part of the shift lever, the initiation of electric generation and the shift to neutral can be accomplished with one motion of the operator. The initiation of motive power is likewise accomplished.

When the electric machine 40 is motoring, a user can command the electric motor controller 60 to operate the electric machine 40 in a fashion to apply torque to the vehicle driveshaft in a direction tending to accelerate the vehicle 10. Electrical energy is transferred from the energy storage system through wires as controlled by the electric motor controller and is converted to mechanical energy by the electric machine 40.

Where the electric machine 40 is generating, a user can command the electric motor controller 60 to operate the electric machine 40 in a manner that applies torque to the vehicle driveshaft in a direction tending to decelerate the vehicle 10. Vehicle kinetic energy is converted to electrical energy by the electric machine 40, is controlled by the electric motor controller 60 and is transferred by wires to the electrical energy storage system 70. This process is generally considered regenerative braking. In a conventional vehicle, kinetic energy is converted to heat energy by the vehicle's brakes.

A state of charge of the energy storage system 70 preferably is maintained within a defined range of Vmax (volts) to Vmin (volts). This range is controlled by the electric motor controller 60. As energy is transferred to the energy storage system 70, the voltage increases. As the increasing voltage approaches Vmax (volts), the electric motor controller 60 begins to limit the amount of energy generated by the electric machine 40. When the voltage of the energy storage system 70 increases to equal Vmax (volts), the electric machine 40 will no longer generate electricity. As energy is transferred from the energy storage system 70, the voltage decreases. As a decreasing voltage approaches Vmin (volts), the electric motor controller 60 begins to limit the amount of energy used to move the vehicle. When the voltage of the energy storage system 70 decreases to be equal to Vmin (volts), the electric motor controller 60 will no longer use electricity to move the vehicle.

The electric load bank 90 converts electrical energy to heat energy and dissipates the heat energy into the surrounding or ambient air. The electric load bank 90 is used to dissipate excess electrical energy that cannot be stored by the electrical energy storage system 70. Thus, the electric load bank 90 can allow the system to operate as a vehicle retarder to reduce brake wear even when the energy storage system is fully charged.

As described above, in some embodiments, the system 12 is designed for retrofit applications. Accordingly, in some embodiments, a kit can be provided that includes component mounting assemblies to allow the components of the system 12 to be efficiently mounted to a particular vehicle. In addition, plugs, electrical wiring and the like also can be provided. Moreover, in some embodiments, no manner of providing external electricity is provided. For example, the system 12 need not be able to be plugged in to a wall or the like. Rather, in a preferred configuration, all of the electricity used by the system also is generated by the system 12 or is supplied during an initial charge used during installation or following maintenance. Once operating under normal frequent use, the charge generated during braking preferably is sufficient for subsequent use. For example, an initial charge of about 150 volts or 200 volts can be used.

Although the present invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A hybrid high gross weight vehicle comprising a manually-operable energy storage and reuse system, the high gross weight vehicle comprising a chassis, the chassis being supported by a propulsive mechanism, the chassis supporting an engine, the engine comprising an output shaft, a drive line transferring power from the output shaft to the propulsive mechanism, a power interrupting member being positioned between the output shaft and the drive line, a transmission having a transmission input shaft, the transmission input shaft being connected to the power interrupting member, the transmission also having a transmission output shaft, the transmission output shaft being connected to an electric machine, the electric machine being mounted to the chassis and being positioned between the transmission output shaft and an input shaft of a differential, an electric motor controller being electrically connected to the electric machine, the electric motor controller processing an output of the electric machine and transferring the output of the electric machine to an electric storage system and the electric motor controller processing an output of the electric storage system and transferring the output of the electric storage system to the electric machine, a manually operable user interface being operable to switch between transfer to the electric storage system and transfer from the electric storage system.

2. The hybrid high gross weight vehicle of claim 1, wherein the propulsive mechanism comprises tracks or four or more wheels.

3. The hybrid high gross weight vehicle of claim 2, wherein the electric machine is a three-phase A-C electric motor.

4. The hybrid high gross weight vehicle of claim 3, wherein the electric machine is connected to the differential by a first universal joint and wherein the electric machine is connected to the transmission output shaft by a second universal joint.

5. The hybrid high gross weight vehicle of claim 3, wherein the electric machine comprises a double ended high strength shaft capable of carrying the vehicle transmission maximum torque from an input end to an output end.

6. The hybrid high gross weight vehicle of claim 3, wherein the electric storage system comprises ultracapacitors.

7. The hybrid high gross weight vehicle of claim 6, wherein the electric storage system comprises a bank of ultracapacitors having a sufficient electrical storage capacity to absorb the energy of only a single major braking event.

8. The hybrid high gross weight vehicle of claim 7, wherein the electric storage system is connected to the electric machine via a breaker or fuse, a relay and a shunt.

9. The hybrid high gross weight vehicle of claim 8, wherein the relay is connected to a key circuit such that when a key switch is closed then the relay closes to connect the electric motor controller and the electric storage system.

10. The hybrid high gross weight vehicle of claim 9, wherein an electric load bank is connected to the electric machine to dissipate electrical energy when the electric storage system is substantially fully charged.

11. The hybrid high gross weight vehicle of claim 10, wherein the electric load bank comprises one or more resistors.

12. The hybrid high gross weight vehicle of claim 10, wherein the electric load bank is connected to and disconnected from the electric storage system through a relay.

13. The hybrid high gross weight vehicle of claim 12, wherein the relay is controlled by an electric load bank controller that is supplied power when the key switch is closed.

14. The hybrid high gross weight vehicle of claim 13, wherein the electric load bank controller measures a voltage of the electric storage system and uses hysteretic control to connect and disconnect the load bank from the electric storage system.

15. The hybrid high gross weight vehicle of claim 8, wherein the shunt is connected to an output display such that energy usage can be monitored.

16. The hybrid high gross weight vehicle of claim 2, wherein the manually operable user interface comprises a manual control member.

17. The hybrid high gross weight vehicle of claim 16, wherein the manual control member is a control knob.

18. The hybrid high gross weight vehicle of claim 16, wherein the manual control member is a pedal-mounted trigger.

19. The hybrid high gross weight vehicle of claim 16, wherein the manual control member is a pair of pedal-mounted triggers.

\* \* \* \* \*